US012632441B1

(12) United States Patent
Hunter et al.

(10) Patent No.: US 12,632,441 B1
(45) Date of Patent: May 19, 2026

(54) SYSTEMS, METHODS, AND MEDIA FOR MONITORING THE INTEGRITY OF ELECTRONIC DATASETS

(71) Applicant: FMR LLC, Boston, MA (US)

(72) Inventors: Kevin J. Hunter, Milford, MA (US); Amritraj D. Naik, Karnataka (IN); Gladwin Anthony Raj Jesuraj, Chennai (IN); Harshita Shrivastava, Bicholi Mardana (IN); Ganesh Bonangi, Justin, TX (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/949,386

(22) Filed: Nov. 15, 2024

(51) Int. Cl.
*G06F 16/00* (2019.01)
*G06F 16/23* (2019.01)
*G06F 16/22* (2019.01)

(52) U.S. Cl.
CPC ........ *G06F 16/2365* (2019.01); *G06F 16/221* (2019.01); *G06F 16/2282* (2019.01)

(58) Field of Classification Search
CPC ....... G06F 16/2365; G06F 16/23; G06F 16/00
See application file for complete search history.

(56) References Cited

U.S. PATENT DOCUMENTS 8,055,635 B2 * 11/2011 Hsu ..................... G06F 16/2455
707/700
2010/0030795 A1 * 2/2010 Pattabhi ............. G06F 21/6227
707/757

* cited by examiner

*Primary Examiner* — Cheryl Lewis
(74) *Attorney, Agent, or Firm* — Cesari and McKenna, LLP

(57) ABSTRACT

Techniques are provided for monitoring the integrity of a table in a dataset. The table may include one or more columns and one or more rows, in which data elements in the table are associated with a specific row and a specific column. A coverage rule set may be generated based on metadata of the table, which describes attributes of the table and the columns associated with the table. The coverage rule set includes table rules and column rules. A table fault value is generated for each table rule in the coverage rule set and a column fault value is generated for each column rule in the coverage rule set. An error is detected when a table fault value or a column fault value exceeds at least one of a corresponding table rule threshold or a corresponding column rule threshold. A notification is transmitted for error detected.

20 Claims, 6 Drawing Sheets

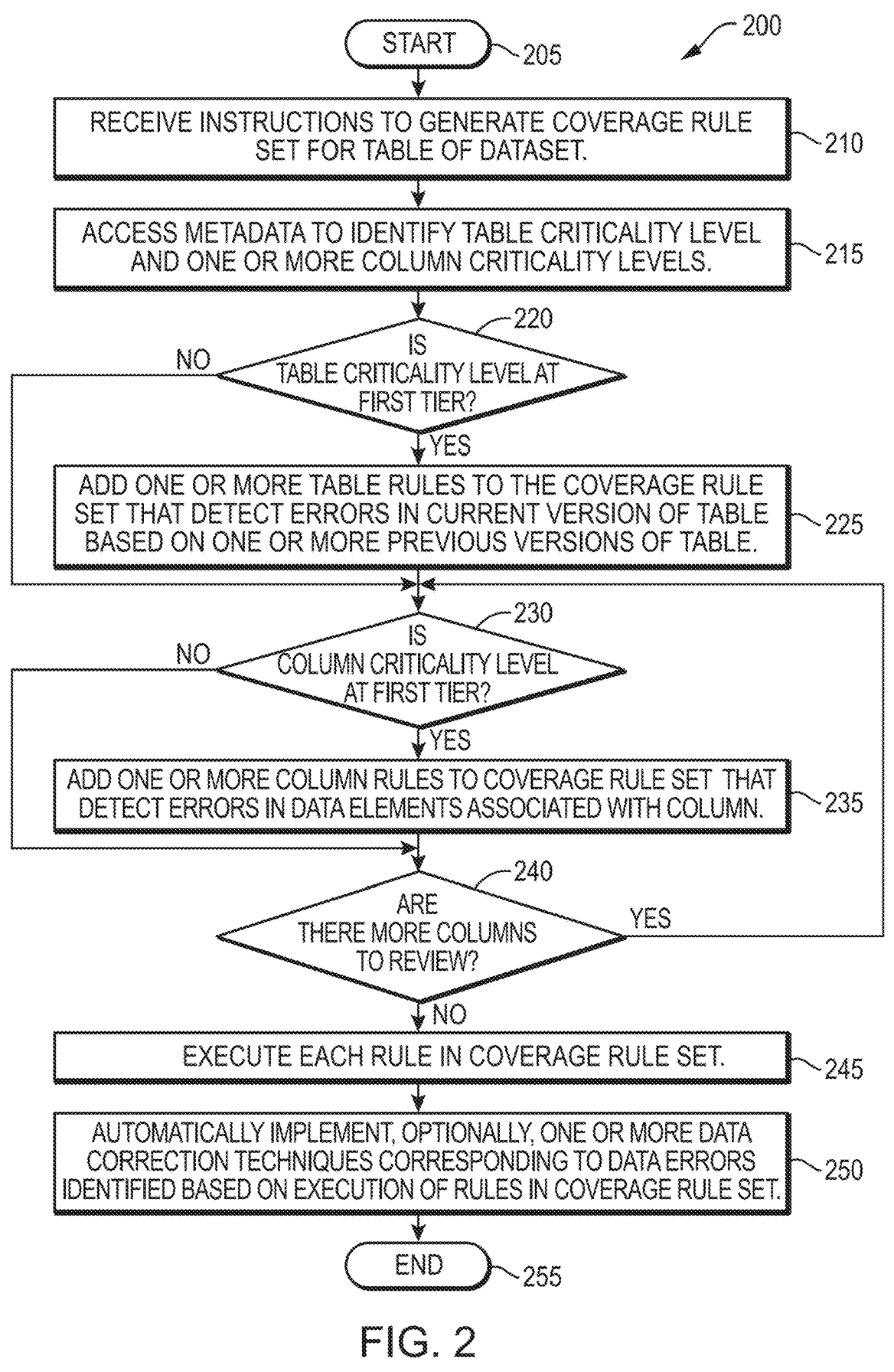

START ～205

～200

RECEIVE INSTRUCTIONS TO GENERATE COVERAGE RULE SET FOR TABLE OF DATASET. ～210

ACCESS METADATA TO IDENTIFY TABLE CRITICALITY LEVEL AND ONE OR MORE COLUMN CRITICALITY LEVELS. ～215

IS TABLE CRITICALITY LEVEL AT FIRST TIER? ～220

NO

YES

ADD ONE OR MORE TABLE RULES TO THE COVERAGE RULE SET THAT DETECT ERRORS IN CURRENT VERSION OF TABLE BASED ON ONE OR MORE PREVIOUS VERSIONS OF TABLE. ～225

IS COLUMN CRITICALITY LEVEL AT FIRST TIER? ～230

NO

YES

ADD ONE OR MORE COLUMN RULES TO COVERAGE RULE SET THAT DETECT ERRORS IN DATA ELEMENTS ASSOCIATED WITH COLUMN. ～235

ARE THERE MORE COLUMNS TO REVIEW? ～240

YES

NO

EXECUTE EACH RULE IN COVERAGE RULE SET. ～245

AUTOMATICALLY IMPLEMENT, OPTIONALLY, ONE OR MORE DATA CORRECTION TECHNIQUES CORRESPONDING TO DATA ERRORS IDENTIFIED BASED ON EXECUTION OF RULES IN COVERAGE RULE SET. ～250

END ～255

FIG. 2

| TABLE 300 | | | | | | |
|---|---|---|---|---|---|---|
| | COLUMN 1 | COLUMN 2 | COLUMN 3 | COLUMN 4 | . . . | COLUMN K |
| ROW 1 | DATA ELEMENT 1-1 | DATA ELEMENT 2-1 | DATA ELEMENT 3-1 | DATA ELEMENT 4-1 | . . . | DATA ELEMENT K-1 |
| ROW 2 | DATA ELEMENT 1-2 | DATA ELEMENT 2-2 | DATA ELEMENT 3-2 | DATA ELEMENT 4-2 | . . . | DATA ELEMENT K-2 |
| ROW 3 | DATA ELEMENT 1-3 | DATA ELEMENT 2-3 | DATA ELEMENT 3-3 | DATA ELEMENT 4-3 | . . . | DATA ELEMENT K-3 |
| ROW 4 | DATA ELEMENT 1-4 | DATA ELEMENT 2-4 | DATA ELEMENT 3-4 | DATA ELEMENT 4-4 | . . . | DATA ELEMENT K-4 |
| ROW 5 | DATA ELEMENT 1-5 | DATA ELEMENT 2-5 | DATA ELEMENT 3-5 | DATA ELEMENT 4-5 | . . . | DATA ELEMENT K-5 |
| ROW 6 | DATA ELEMENT 1-6 | DATA ELEMENT 2-6 | DATA ELEMENT 3-6 | DATA ELEMENT 4-6 | . . . | DATA ELEMENT K-6 |
| ⋮ | ⋮ | ⋮ | ⋮ | ⋮ | ⋮ | ⋮ |
| ROW N | DATA ELEMENT 1-N | DATA ELEMENT 2-N | DATA ELEMENT 3-N | DATA ELEMENT 4-N | . . . | DATA ELEMENT K-N |

FIG. 3

SYSTEMS, METHODS, AND MEDIA FOR MONITORING THE INTEGRITY OF ELECTRONIC DATASETS

TECHNICAL FIELD

This application relates generally to systems and methods, including computer program products, for detecting errors in tables associated with electronic datasets and more, specifically, for rapid deployment of rules to detect errors in electronic datasets.

BACKGROUND

An organization may have (or acquire) large amounts of data that are stored in databases on storage devices (e.g., servers). The database may allow for one or more operations, such as creation, reading, modification, and deletion of data. Such operations may be performed on a continuous basis. For example, an organization may perform the aforementioned operations throughout the day due to changes in information managed by the organization that might be caused by any of a variety of different reasons. Such reasons may include, but are not limited to, a release of a new product, hiring of new employees, managing projects, receiving and sending emails, adding new customers (or students), deposits and withdrawals from a customer account, or changes in the customer's information. As such, due to managing and organizing substantial amounts of the aforementioned information, it is no surprise that databases store such a large amount of data. Indeed, the largest organizations may have terabytes, petabytes, or exabytes of data being stored in their databases.

Nevertheless, databases are not entirely reliable. In other words, data errors may appear due to a variety of factors. For example, there may be software errors (e.g., bugs) that cause inconsistencies in data during updates or modifications. In another example, human error may be the cause of data errors, in which accidents, such as typographical errors or unintentional deletion of data may occur. In a further example, there may be hardware failures (e.g., due to old age or physical damage) with respect to storage devices (e.g., servers) having the databases thereon that can cause data errors or data corruption.

In yet another example, transmission of data may also result in data errors as well. More specifically, data may be stored in a centralized database located on a storage computing device (e.g., server). A copy of such data may be transferred to one or more intermediary databases (that may be disposed on another computing device), which are then accessed to be viewed on one or more user devices (e.g., employees of the organization). Such transfer may be performed to allow quicker access to the contents of the database (e.g., local viewing). However, the data stored in the intermediary databases may not exactly match the data stored in the centralized database because of corruption during the data transmission, thereby creating errors in the data stored at the intermediary databases.

It can be difficult to detect such errors, since there may be more than a million data elements corresponding to hundreds of thousands of datasets in the database (e.g., terabytes, petabytes, or exabytes of data). Further, as discussed previously, databases may be continuously updated, such that the data in the database continuously grows without end (e.g., constantly adding new emails or customers every day). Such continuous growth exacerbates the difficulty in detecting errors. As a result, errors in the dataset may go undetected. Therefore, the data errors that are undetected will not be corrected, which in turn can result in inconsistent electronic data and/or corrupted electronic data. Having inconsistent and/or corrupted electronic data is not desirable for organizations/enterprises for obvious reasons and can negatively impact an organization's success and growth.

One possible solution to this problem is to utilize rules to detect the integrity of tables in datasets stored in databases. For example, the violation of a rule may indicate the existence of an error in the dataset. However, such rules have their deficiencies and can often lead to many instances of false positives, in which a rule may detect an error in the dataset when no such error exists. This can be a considerable issue. As discussed previously, organizations may have terabytes, petabytes, or exabytes of data being stored in their databases. As such, it would take a substantial amount of time and effort in verifying whether each data element (identified as an error by the rule) is a true error or a false positive. Indeed, this is especially difficult when it is known that such rules produce large amounts of false positives. Consequently, it would be more productive to avoid using such rules to detect errors, and, instead, risk the possibility of errors in the dataset.

Moreover, the administrator monitoring the quality of the datasets must often write the rules themselves, which can be a very laborious process if hundreds or thousands of rules are required. Further, compounding this laborious process is the fact that different datasets may require their own unique rules. Therefore, there remains a need for a solution to the aforementioned problems, that includes rapid deployment of rules for detecting errors in data (e.g., in databases) and preventing (or reducing) false positives in error detection. This in turn would allow organizations to correct issues associated with valid and true data errors, such that data integrity is maintained.

SUMMARY

Techniques are provided for monitoring the integrity of a table in an electronic dataset according to the one or more embodiments as described herein. As will be described in further detail below, the one or more embodiments may automatically generate one or more rules to detect errors in a table in an electronic dataset.

In an embodiment, a processor (e.g., a processor executing an error detection module) may perform a process to detect errors in a table of a dataset. As used herein, dataset is meant to refer to an electronic dataset. The table may include one or more columns and one or more rows, in which data elements in the table are associated with a specific row and a specific column. The processor may generate a coverage rule set based on metadata of the table, which describes attributes of the table and the columns associated with the table.

The coverage rule set includes one or more table rules and one or more column rules. In some embodiments, the table rules are configured to detect errors in a current version of the table based on one or more previous versions of the table. In other embodiments, the one or more column rules are configured to detect errors in one or more data elements associated with the columns of the table. Further, the one or more table rules are each associated with one or more table rule thresholds that are ordered by degrees of urgency, and the one or more column rules are each associated with one or more column rule thresholds that are ordered by degrees of urgency.

The processor generates a table fault value for each table rule in the coverage rule set and a column fault value for each column rule in the coverage rule set. An error is detected when a table fault value or a column fault value exceeds at least one of a corresponding table rule threshold or a corresponding column rule threshold. The processor transmits a notification for each table rule or column rule that has detected an error in the table. The notification includes a result status that indicates a degree of urgency corresponding to a respective table rule or column rule.

In some embodiments, the notification is in the form of a user interface icon, in which the degree of urgency is represented by different states of the user interface icon. For example, the user interface icon may be color-coded, in which different colors of the icon (e.g., green, amber, red) may indicate Thus, the aforementioned process performed by the processor allows for rapid deployment of rules to detect errors, i.e., true errors, in datasets, while reducing the occurrence of false positives.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a sequence of steps for automatically generating a coverage rule set that includes one or more rules for detecting errors in a table of a dataset according to the one or more embodiments as described herein;

FIG. 3 is an example of a table including one or more columns, one or more rows, and one or more data elements that are each associated with a specific column and a specific row, according to the one or more embodiments as described herein;

DETAILED DESCRIPTION

Figure 1:
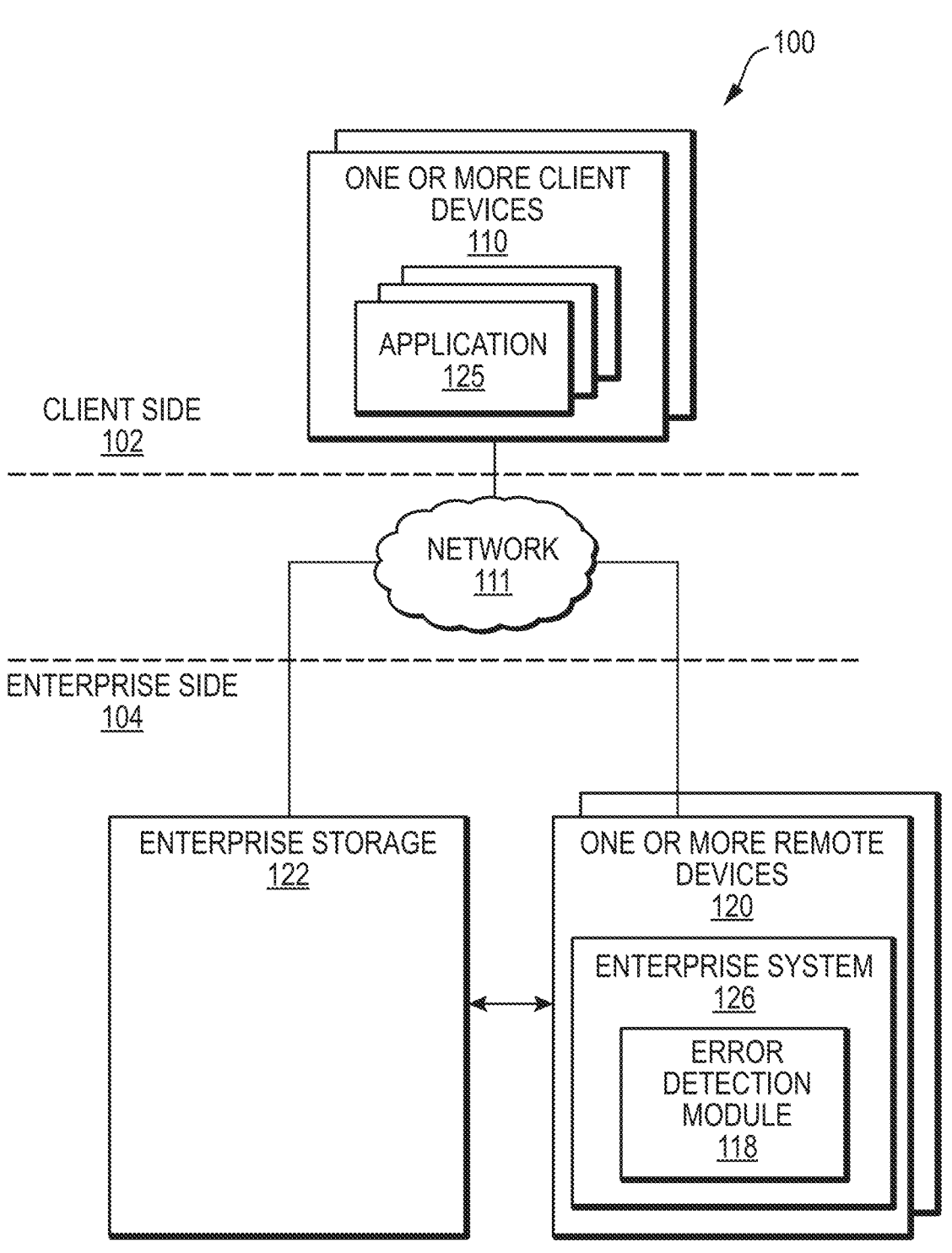
FIG. 1 is a high-level block diagram of an example system environment, in which more embodiments as described herein.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools are discussed herein to facilitate the invention(s) disclosed herein. It should be appreciated by those skilled in the art that any one or more of such tools may be embedded in the application and/or in any of various other ways, and thus while various examples are discussed herein, the inventive aspects of this disclosure are not limited to such examples described herein.

FIG. 1 is a high-level block diagram of an example system environment 100 for updating, managing, and maintaining a reference template for webs service API testing according to one or more embodiments as described herein. The system environment 100 may be divided into a client side 102 that includes one or more local client devices 110 that are local to end users, and an enterprise side 104 that includes one or more remote devices 120 and enterprise storage 122 that are remote from the end users. Enterprise side 104 may be managed, operated, and maintained by an enterprise. In an embodiment, the enterprise of enterprise side may be a financial services institution.

The client side 102 may include one or more local client devices 110 that provide a variety of user interfaces and non-processing intensive functions. For example, a local client device 110 may provide a user interface, e.g., a graphical user interface and/or a command line interface, for receiving user input and displaying output according to the one or more embodiments as described herein. In an embodiment, the client device 110 may be a server, a workstation, a platform, a mobile device, a network host, or any other type of computing device. The client device 110 may be operated by, for example, customers of the enterprise. Client device 110 may also be operated by authorized personnel, e.g., employees of the enterprise, to perform enterprise functions. For example, client device 110 may download and execute application 125 that is provided by the enterprise. The execution of application 125 may allow customers and/or employees of the enterprise to implement one or more financial services functions.

The client device 110 may communicate with the enterprise system 126, managed/operated by the enterprise, over network 111. For example, a user may utilize application 125, executing on client device 110, to perform one or more functions at enterprise system 126 as will be described in further detail below.

Enterprise side 104 includes enterprise storage 122 that may store one or more templates, files, data structures, etc. that may be generated or utilized according to the one or more embodiments as described herein. For example, enterprise storage 122 may store one or more datasets. The information stored in the dataset may include, but is not limited to, text, numbers, images, and/or videos. Further, information stored by each dataset may be organized into one or more tables associated with the dataset. Each table may include one or more rows and one or more columns. Further, each table may include one or more data elements each of which is associated with an intersection of a specific row and a specific column. In some embodiments, the enterprise storage 122 may include one or more databases (e.g., relational databases), hard disk drives (HDDs), and/or sold state drives (SSDs).

The enterprise side 104 also includes one or more remote devices 120 that may be one or more cloud-based devices and/or one or more server devices. The one or more remote devices 120 may store and execute enterprise system 126 that may implement the one or more embodiments as described herein. The enterprise system 126 may be accessible to its customers and/or authorized personnel, e.g., employees of the enterprise. The enterprise system 126 includes an error detecting module 118 that may implement the one or more embodiments as described herein.

In an embodiment, only authorized personnel of the enterprise can execute the error detecting module 118 to implement the one or more embodiments as described herein. For example, authorized personnel of the enterprise may utilize client device 110 to execute error detecting module 118 to implement one or more embodiments as described herein. As will be described in further detail below, the error detecting module 118 may be instructed to generate a coverage rule set (having one or more rules) for one or more tables associated with a dataset. The error detecting module 118 may generate the coverage rule set based on metadata associated with each of the one or more tables. After generating the coverage rule set, the error detecting module 118 may execute each rule in the coverage rule set on the table, and may detect one or more errors in the table upon execution of the one or more rules. Further, the error detecting module 118 may generate a notification that indicates one or more detected errors.

FIG. 2 is a flow diagram of a sequence of steps for automatically generating a coverage rule set that includes one or more rules for detecting errors in a table of a dataset according to the one or more embodiments as described herein.

The procedure 200 starts at step 205 and continues to step 210 where the error detecting module 118 receives instructions to generate a coverage rule set for a table of a dataset. In some embodiments, the error detecting module 118 may receive instructions to generate a coverage rule set for each table in the dataset (e.g., the error detecting module 118 may perform the procedure 200 for each table in the dataset). The coverage rule set may include one or more rules that are each configured to detect one or more errors in a table of the dataset. The dataset may be an organized collection of information that is stored electronically in a database or a computing system, such as the enterprise storage 122. The information stored in the dataset may include, but is not limited to, text, numbers, images, and/or videos. Further, information stored by the dataset may be organized into one or more tables associated with the dataset.

As shown by the example in FIG. 3, a table may include one or more columns (e.g., columns 1-K, where K is a positive integer) and rows (e.g., rows 1-N, where N is a positive integer), in which each column may represent a specific category of information and each row may represent entities or objects that are associated with one or more categories represented by the columns. In addition, each table may also include one or more data elements (e.g., data element 1-1, 1-2, . . . , K-N), in which each data element is associated with a column and a row of the table (e.g., an intersection of a column and a row). Further, each table in the dataset may be associated with metadata, which is data that describes data (or content) in the table. The metadata may be associated with a table criticality level and a column criticality level for each column in the table. The table criticality level may correspond to an importance level of a table, and the column criticality level may correspond to an importance level of a column.

For example, the dataset may include information regarding employees at an organization, in which each table represents an office or branch of the organization, each column representing attributes associated with the employee (e.g., name, social security number, date of birth, office number, work phone number, etc.), and each row of the table representing each employee within the office associated with the table. As such, a data element of a table may include a specific attribute of a particular employee (e.g., a data element of an employee associated with the first row and column "name" may be "John Doe". Further, the metadata associated with this table may indicate that the table has a table criticality level of a first tier. Further, the columns associated with name, social security number, and date of birth may each be associated with a column criticality importance level of a first tier, and the columns associated with the office number and work phone number may be associated with a column criticality importance level of a second tier, in which the second tier is lower than the first tier in terms of importance.

The procedure continues to step 215, in which the error detecting module 118 accesses metadata to identify a table criticality level and one or more column criticality levels. In some embodiments, the error detecting module 118 accesses metadata of the dataset, which includes a table criticality level and one or more column criticality levels for each table associated with the dataset. In other embodiments, the error detecting module 118 accesses the metadata of the table which describes its own table criticality level and its own column criticality level(s).

The procedure continues to step 220, in which the error detecting module 118 determines whether the table criticality level is at a first tier. As discussed previously, the table criticality level is associated with one of a first tier, a second tier, a third tier, etc. If, at step 220, the error detecting module 225 determines that the table criticality level is at a first tier, the procedure continues to step 225. At step 225, the error detecting module 118 adds one or more table rules to the coverage rule set that detect errors in current version of table based on one or more previous versions of table. For example, each table rule may be configured specifically to detect errors in the table as a whole. In another example, each table rule may detect errors in the table by comparing a current version of the table to one or more previous versions of the table. The process then continues to step 230. If, at step 220, the error detecting module 118 determines that the table criticality level is not at a first tier, the error detecting module 118 does not add one or more table rules to the coverage rule set, and the procedure continues to step 230. As such, it should be noted that it is possible that the table may not be associated with any table rules.

At step 230, the error detecting module 118 determines whether a column criticality level is at a first tier. For example, the error detecting module 118 may determine whether the column criticality level is at a first tier for each column in the table. As discussed previously, each column criticality level is associated with one of a first tier, a second tier, a third tier, etc. In some embodiments, the error detecting module 118 iterates through each column in the table, beginning with the first column (e.g., column 1 in FIG. 3) until the last column (e.g., column K in FIG. 3), when determining whether the column criticality level is at a first tier for each column in the table. If, at step 230, the error detecting module 118 determines that the column criticality level is at a first tier, the procedure continues to step 235.

At step 235, in which the error detecting module 118 adds one or more column rules to the coverage rule set that detects errors in data elements that are associated with the present column (which was reviewed for its corresponding column criticality level). For example, a column rule may detect an error based on a data type specified for the present column. In another example, each column rule (in the coverage rule set) corresponding to the present column may be executed specifically for the present column (e.g., but not execute for columns other than the present column). In a further example, none of the column rules are the same as the table rules. The process then continues to step 240. If, at step 230, the error detecting module 118 determines that the column criticality level is not at a first tier, the procedure continues to step 240.

At step 240, the error detecting module 118 determines whether there are more columns to review. More specifically, the error detecting module 118 reviews each column in the table to determine its column criticality level. As discussed previously, the error detecting module 118 may iterate through each column from the first column until the last column. As such, it should be noted that not all of the columns may have one or more column rules. For example, with reference to FIG. 3, columns 1 and 3 may not be associated with any column rules, while the remaining columns 2 and 4 . . . . K may each be associated with one or more rules. In another example, it may be that none of the columns in the table are associated with any column rules.

If, at step 240, the error detecting module 118 determines that there are more columns to review, the procedure continues to step 230. If, at step 240, the error detecting module 118 determines that there are no more columns to review (e.g., error detecting module 118 has already reviewed the last column), the procedure continues to step 245. At step 245, the error detecting module 118 executes each rule in the coverage rule set. As discussed previously, the error detecting module 118 may execute each table rule on the table (as a whole) and execute one or more column rules for each column that is associated with at least one column rule. In some embodiments, the execution of each rule in the coverage rule set may identify one or more data errors in the table.

The procedure continues to step 250, in which the error detecting module 118 automatically implements, optionally, one or more data correction techniques corresponding to data errors identified based on execution of rules in coverage rule set. More specifically, after the rules in the coverage rule set identifies one or more data errors in the table (e.g., as a whole and including columns), the error detecting module 118 may perform one or more data correction techniques for the one or more data errors identified. The one or more data correction techniques may, for example, correct the errors in the table, such that the table no longer violates each of the rules in the coverage rule set. It should be noted that the implementation of step 250 is optional (e.g., not a necessary step in the procedure 200). Therefore, the errors may be corrected using a manual procedure.

In some embodiments, a rule in the coverage rule set may include a timeliness rule (described in greater detail infra), in which the timeliness rule determines whether an error has occurred due to the lack of an update table at a certain time period. As such, the error detecting module 118 may perform a data correction technique by causing an updated table to be generated within a specific time period after the certain time period has ended. In other embodiments, a rule in the coverage rule set may include a consistency rule (described in greater detail infra), in which the consistency rule determines whether an error has occurred based on the average variability between a current version of the table and a trusted table in a trusted source. As such, the error detecting module 118 may perform a data correction technique by replacing the current version of the table with the trusted table retrieved from the trusted source. In further embodiments, the coverage rule set may include a completeness rule (described in greater detail infra) that determines whether a data error has occurred due to one or more data elements being missing from the column (e.g., one or more rows corresponding to the column being empty). As such, the error detecting module 118 may perform a data correction technique by inserting one or more predetermined default values for the one or more missing data elements. Such predetermined default values are each configured specifically for each column in the dataset (e.g., default value of nine zeroes for missing data element in column pertaining to Social Security Number). The procedure 200 ends at step 255.

As such, the procedure 200 may allow automatic generation of a coverage rule set having one or more rules (e.g., table rules, column rules) to detect errors in a table. By allowing such automatic generation based on metadata of the table, one or more rules can be rapidly deployed to detect errors in the table. Further, because the one or more rules are based on specific attributes of the table (e.g., metadata of the table), the execution of the one or more rules according to the one or more embodiments as described herein reduce the possibility of false positives when detecting errors for electronic data that is stored on a database. Because the one or more embodiments as described herein reduce the possibility of false positives when compared to conventional systems and techniques, the one or more embodiments as described herein provide an improvement in the existing technology field of database operation and/or management. Further, the one or more embodiments as described herein more accurately identify true dataset errors when compared to conventional systems and techniques. As such, the one or more embodiments as described herein also provide an improvement in the existing technological field of electronic data error detection. Accordingly, the one or more embodiments as described herein integrate the procedure 200 of FIG. 2 into the practical application of computer database management and operation.

It should be noted that, in some embodiments, the error detecting module 118 is not limited to the procedure 200 for determining one or more table rules and/or one or more column rules to be included in the coverage rule set of the present table. For example, the table rules and/or the column rules in the coverage rule set are determined by other criteria including data element name, table name, business terms, and/or data profiles. More specifically, such criteria may be attributes that are associated with the table. Further, such attributes may be stored as metadata associated with the table. In addition, it should further be noted that other rules for detecting errors (other than table rules or column rules) may be added to the coverage rule set.

In other embodiments, the error detecting module 118 may scan existing tables (having a coverage rule set) within the dataset or other datasets to determine whether the scanned tables have coverage rule sets that are appropriate to the present table. For example, the error detecting module 118 may determine how similar the table type, column type, data elements, data element names, table names, business terms, and/or data profiles of the scanned tables are to the present table. The error detecting module 118 may then obtain table rules and column rules from one or more of the scanned tables. For example, the error detecting module 118 may obtain (to be included in the coverage rule set of the present table) at least one table rule from a first table and at least one column rule from a second table. In another example, the error detecting module 118 may obtain at least one table rule and at least one column rule from a first table and two or more column rules from a second table.

In further embodiments, the error detecting module 118 may also generate a coverage rule set for each view that is generated based on tables in the dataset or other datasets. A view may be a table whose contents (e.g., data elements) are generated based on a query. For example, a view may be a combination of data elements associated with different rows or columns from multiple existing tables in the dataset. Further, when generating a view, the data elements obtained from the other existing tables may be transformed or altered based on the query (e.g., the date format is altered from year-month-day to month-day-year or the salary of employees are rounded up or down). In addition, the view may also include one or more new rows or columns, which are generated based on the data elements in the multiple existing tables and based on the query.

As such, when generating a coverage rule set for a view, the error detecting module 118 may generate new column rules for columns having data elements that have been altered or are non-existent in the multiple existing tables. For columns having unaltered data elements that have existed in the multiple existing tables, the error detecting module 118 may not generate any column rules for such columns. To facilitate such a process for generating column rules for the coverage rule set, the error detecting module 118 may scan the underlying code used to generate the view. Then, the error detecting module 118 identifies columns having data elements that have been altered or are new. Next, the error detecting module 118 generates and executes column rules for such columns, while leaving the remaining columns untouched. By generating and executing rules for a subset of columns, the costs in time and processing for generating and executing rules on a view are substantially reduced. Such an advantage is noticeable in cloud environments, in which there may be substantial costs to executing one or more instructions. Therefore, the one or more embodiments as described herein provide an improvement in the existing technological field of cloud computing.

The above-described techniques associated with FIG. 2 can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Figure 4:
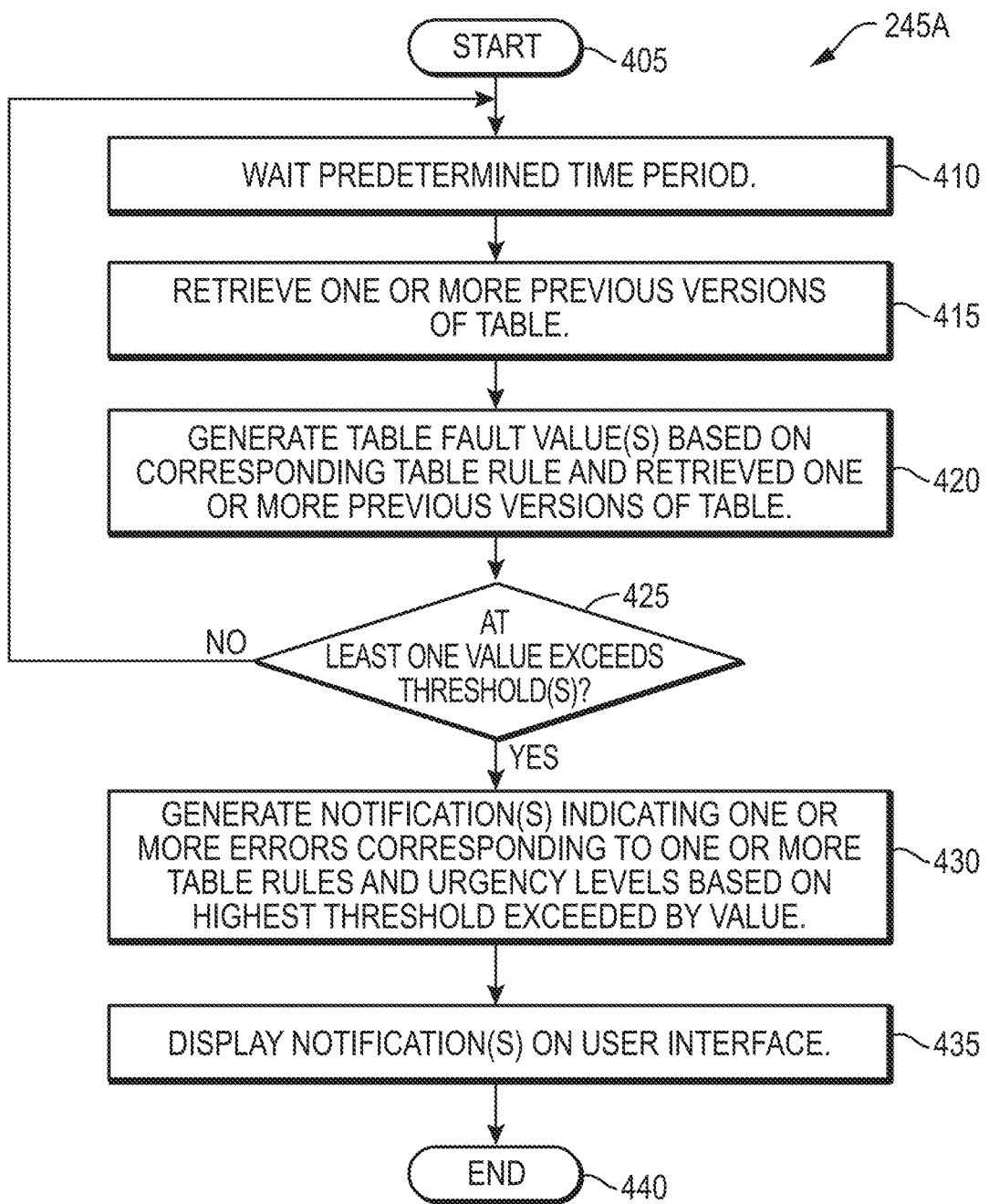
FIG. 4 is a flow diagram of a sequence of steps for automatically executing one or more table rules on a corresponding table of a dataset according to the one or more embodiments as described herein.

FIG. 4 is a flow diagram of a sequence of steps for automatically executing one or more table rules on a corresponding table of a dataset according to the one or more embodiments as described herein.

The procedure 245A may be a possible execution of step 245 of FIG. 2 according to some embodiments. As such, the procedure 245A starts at step 405 and continues to step 410 where the error detecting module 118 waits a predetermined period of time (e.g., seconds, minutes, days, months, years, etc.). For example, the error detecting module 118 may execute the one or more table rules after waiting a predetermined time period after the completion of the coverage rule set (e.g., after all table rules and column rules have been determined). In another example, the error detecting module 118 may execute the one or more table rules after waiting a predetermined amount of time after the a previous execution of the one or more table rules. In some embodiments, the error detection module 118 executes in time intervals, in which each time interval is equivalent to the predetermined period of time. In other embodiments, the dataset or the table may be updated in time intervals, in which each time interval is equivalent to the predetermined period of time. As such, the existence of a new version of the table may cause (or trigger) execution of each table rule in the coverage rule set.

The procedure continues to step 415, in which the error detecting module 118 retrieves the one or more previous versions of the table. For example, as discussed previously, the dataset or the table may be updated periodically (e.g., according to the predetermined time period). Further, such previous versions of the table may be stored within the enterprise storage 122. As such, the error detecting module 118 may obtain the one or more previous versions of the table from the enterprise storage 122.

The procedure continues to step 420, in which the error detecting module 118 generates one or more table fault values based on the corresponding table rule and the retrieved one or more previous versions of the table. More specifically, the error detecting module 118 may generate a table fault value for each table rule in the coverage rule set. Further, each table fault value may be generated using a specific process associated with each table rule. As such, the error detecting module 118 may generate a table fault value set that includes at table fault value for each table rule in the coverage rule set.

For example, each of the table fault value may be a number (e.g., integer, decimal, fraction, percentage, etc.) or binary value (e.g., one/zero, yes/no, true/false). In another example, each of the table fault values may be determined based on the contrast between the current version of the table and the one or more previous versions of the table. In some embodiments, the contrast may be between the data elements of the current version of the table and the data elements of the one or more previous versions of the table. In other embodiments, the contrast may be between the metadata of the current version of the table and the metadata of the one or more previous versions of the table. As such, it should be noted that the table fault value may be determined in a different manner for each table rule. Further, the type of table fault value (e.g., number, binary value, etc.) may also be different for each table rule as well.

At step 425, the error detecting module 118 determines whether at least one table fault value (of the table fault value set) exceeds a corresponding one or more predetermined thresholds. More specifically, each table rule is associated with (1) a specific process for generating the table fault value and (2) one or more predetermined thresholds. Each of the one or more predetermined thresholds associated with a specific table rule may indicate an error detected in the table, when the table fault value (generated using the specific table rule) exceeds at least one of the one or more predetermined thresholds associated with the specific table rule. For example, each of the predetermined thresholds may be a number (e.g., integer, decimal, fraction, percentage, etc.) or binary value (e.g., one/zero, yes/no, true/false).

In addition, each of the one or more predetermined thresholds (that are associated with a specific table rule) may be a predetermined value (e.g., urgency level) that is arranged in a predetermined order based on urgency or severity of the error(s). In other words, a higher urgency level (e.g., based on priority) indicates a more serious or a more pressing error has occurred in the table. Conversely, a lower urgency level (e.g., based on priority) indicates a less serious error has occurred in the table. In some embodiments, a larger valued urgency level (e.g., a larger number) signifies a more urgent error detected in the table, while a lower valued urgency level (e.g., a smaller number) signifies a more minor error detected in the table. In other embodiments, a table rule may include only a single urgency level (e.g., binary value indicating whether an error was detected).

If, at step 425, the error detecting module 118 determines that at least one table fault value (of the table fault value set)

does not exceed at least one of the one or more predetermined thresholds (e.g., a single table fault value of the table fault value sets fails to exceed any of the one or more predetermined thresholds corresponding to the table fault value), the procedure moves back to step 410.

If, at step 425, the error detecting module 118 determines that at least one table fault value exceeds at least one of the one or more predetermined thresholds, the process moves to step 430. As discussed previously, there may be more than one predetermined threshold, in which each predetermine threshold is arranged in order of urgency. Further, as also discussed previously, each of the one or more predetermined thresholds indicates an error detected in the table, when the table fault value exceeds at least one of the corresponding one or more predetermined thresholds. As such, it may be sufficient for the table fault value to exceed the lowest predetermined threshold for an error to be detected. Further, as discussed previously, the execution of the one or more table rules according to procedure 400 reduces the possibility of false positives.

At step 430, the error detecting module 118 generates (1) a notification indicating an error corresponding to the table rule and (2) an urgency level that is based on highest threshold exceeded by value. At step 435, the error detecting module 118 displays one or more notifications on a user interface. For example, the notification may be displayed on a user interface corresponding to the application 125 on a client computing device 110. In addition, the notification may, for example, provide a message indicating the error that was detected by a specific table rule.

In some embodiments, the notification may be a color-coded icon or indicator, in which the colors of the icon correspond to the highest predetermined threshold exceeded by the table fault value. For example, red may be associated with the highest predetermined threshold, orange may be associated with the next highest predetermined threshold, and yellow may be associated with the lowest predetermined threshold. Likewise, the color-coded icons may also be for the benefit of the user of the application 125, since the color red usually means a higher degree of severity and the color yellow usually means a lesser degree of severity (e.g., warning).

It should be noted that in some embodiments, an indicator may be presented to the user even in the case that no errors have been detected by a specific table rule (e.g., a table fault value of a table fault value set fails to exceed any corresponding predetermined thresholds). In such a case, the indicator may be color-coded (e.g., green) to indicate that the specific table rule has been successfully executed (but that no error was detected). In other embodiments, a color-coded indicator may be presented to the user regardless of whether an error was detected, in the case that the specific table rule was executed successfully.

In some embodiments, a table rule in the coverage rule set may include a timeliness rule, in which the timeliness rule determines whether an error has occurred due to the lack of an update table at a certain time period. For example, the error detecting module 118 (when executing the timeliness rule) may analyze the previous versions of the table (e.g., metadata of previous versions of the table) to determine the frequency or time interval (e.g., seconds, days, months, years, etc.) in which each table is updated. As such, the table fault value associated with the timeliness rule may be a binary value, which indicates whether an updated table has been generated at a specific time based on the time interval associated with the previous versions of the table (e.g., whether a customer table (indicating total customers at an organization) has been updated at 9:00 AM in the morning of each day). Further, there may be a predetermined threshold (e.g., zero) associated with the timeliness rule, in which a binary value of zero (e.g., not exceeding the predetermined threshold) indicates that no error has been detected (e.g., an updated table has been generated) and a binary value of one (e.g., exceeding the predetermined threshold of zero) indicates that an error has been detected (e.g., an updated table has not been generated).

In some embodiments, a table rule in the coverage rule set may include a variance rule, in which the variance rule determines whether an error has occurred based on an average variability between a current version of table and one or more previous versions of the table. For example, the error detecting module 118 (when executing the variance rule) may analyze the previous versions of the table (e.g., number of rows in the previous versions of the table) to determine the average variability in the number of rows among each of the previous version of the table. As such, the table fault value associated with the variance rule may be a numerical value, which indicates a percentage of variance in the number of rows in the current version of the table with respect to the previous versions of the table.

Further, there may be multiple predetermined thresholds (e.g., 1%, 2.5%, etc.) associated with the variance rule. For example, a variance percentage (e.g., not exceeding any of the predetermined thresholds) indicates that it is less likely that an error has occurred or been detected. In another example, a variance percentage exceeding a first predetermined threshold (e.g., 1%) but below a second predetermined threshold (e.g., 2.5%) may indicate that there is a low risk of an error being detected. As such, a color-coded indicator may display an amber color (e.g., warning). In a further example, a variance percentage exceeding a second predetermined threshold (e.g., 2.5%) may indicate that there is a high risk of an error being detected. As such, a color-coded indicator may display a red color (e.g., take action immediately to correct errors).

For example, with respect to the variance rule, the table may include a total number of customers at an organization over a time period (e.g., days, weeks, months, years, etc.), in which the organization may gain or lose customers. Nevertheless, outside of extraordinary circumstances (e.g., black swan events), there should be no huge variance in the total number of customers over a time period (e.g., day to day). To overcome the existence of extraordinary circumstances, the time periods identified as extraordinary circumstances may be removed from the analysis.

In another example, the daily attendance list of employees (e.g., which employees have showed up at work that specific day). In such case, the one or more previous versions of tables may be obtained for time periods on weekdays (but not weekends, since most employees do not work on weekends). As such, specific time periods may be selected based on the circumstances corresponding to the table in order to accurately perform error detection.

In some embodiments, a table rule in the coverage rule set may include a consistency rule of the first type (first consistency rule) and a consistent rule of the second type (second consistency rule). When executing the first consistency rule, the error detecting module 118 determines whether an error has occurred based on the differences between the current version of the table and a previous version of the table. For example, the error detecting module 118 (when executing the first consistency rule) may analyze the previous version of the table (e.g., data elements in the previous version of the table) to determine the percentage of differences in the data elements between current version of the table and the previous version of the table. As such, the table fault value associated with the first consistency rule may be a numerical value, which indicates a percentage of differences in the data elements of the current version of the table with respect to the previous version of the table. In another example, the table fault value may be a numerical value indicating the percentage of differences in the data elements of the current version of the table with respect to the average number of differences among the data elements of two or more previous versions of the table (e.g., two or more versions over a predetermined time period).

Further, there may be multiple predetermined thresholds (e.g., 1%, 2.5%, etc.) associated with the first consistency rule. For example, a first consistency percentage (e.g., not exceeding any of the predetermined thresholds associated with the first consistency rule) indicates that it is less likely that an error has occurred or been detected. In another example, a first consistency percentage exceeding a first predetermined threshold of the first consistency rule (e.g., 1.5%) but below a second predetermined threshold of the first consistency rule (e.g., 2%) may indicate that there is a low risk of an error being detected. As such, a color-coded indicator may display an amber color (e.g., warning). In a further example, a first consistency percentage exceeding a second predetermined threshold of the first consistency rule (e.g., 2%) may indicate that there is a high risk of an error being detected. As such, a color-coded indicator may display a red color (e.g., take action immediately to correct errors).

It should be noted that the predetermined thresholds may take into account the possibility of a growing table. For example, the table may continuously add more data elements for each passing time period (e.g., new customers being added to a total list of customers), thereby creating a difference between the current version of the table and a previous version of the table. Nevertheless, as is evident, such difference may not necessarily constitute an error. Therefore, in some cases, it may be normal (or natural) to have the first consistency percentage being between 0% and 1.5%.

When executing the second consistency rule, the error detecting module 118 determines whether an error has occurred based on the differences between the current version of the table and a trusted source table. The trusted source table may be identified automatically via source-code lineage. For example, the error detecting module 118 (when executing the second consistency rule) may analyze the trusted source table (e.g., data elements in the trusted source table) to determine the percentage of differences in the data elements between current version of the table and the trusted source table. As such, the table fault value associated with the second consistency rule may be a numerical value, which indicates a percentage of differences in the data elements of the current version of the table with respect to the trusted source table.

Further, there may be multiple predetermined thresholds (e.g., 1%, 2.5%, etc.) associated with the second consistency rule. For example, a second consistency percentage (e.g., not exceeding any of the predetermined thresholds) indicates that it is less likely that an error has occurred or been detected. In another example, a second consistency percentage exceeding a first predetermined threshold of the second consistency rule (e.g., 1.5%) but below a second predetermined threshold of the second consistency rule (e.g., 2%) may indicate that there is a low risk of an error being detected. As such, a color-coded indicator may display an amber color (e.g., warning). In a further example, a second consistency percentage exceeding a second predetermined threshold of the second consistency rule (e.g., 2%) may indicate that there is a high risk of an error being detected. As such, a color-coded indicator may display a red color (e.g., take action immediately to correct errors). In yet a further example, there may be a single predetermined threshold associated with the second consistency rule (e.g., greater than 0%), in which a color-coded indicator may display a red color (e.g., take action immediately to correct errors), when there is not an exact match between the current version of the table and the trusted source table.

Figure 5:
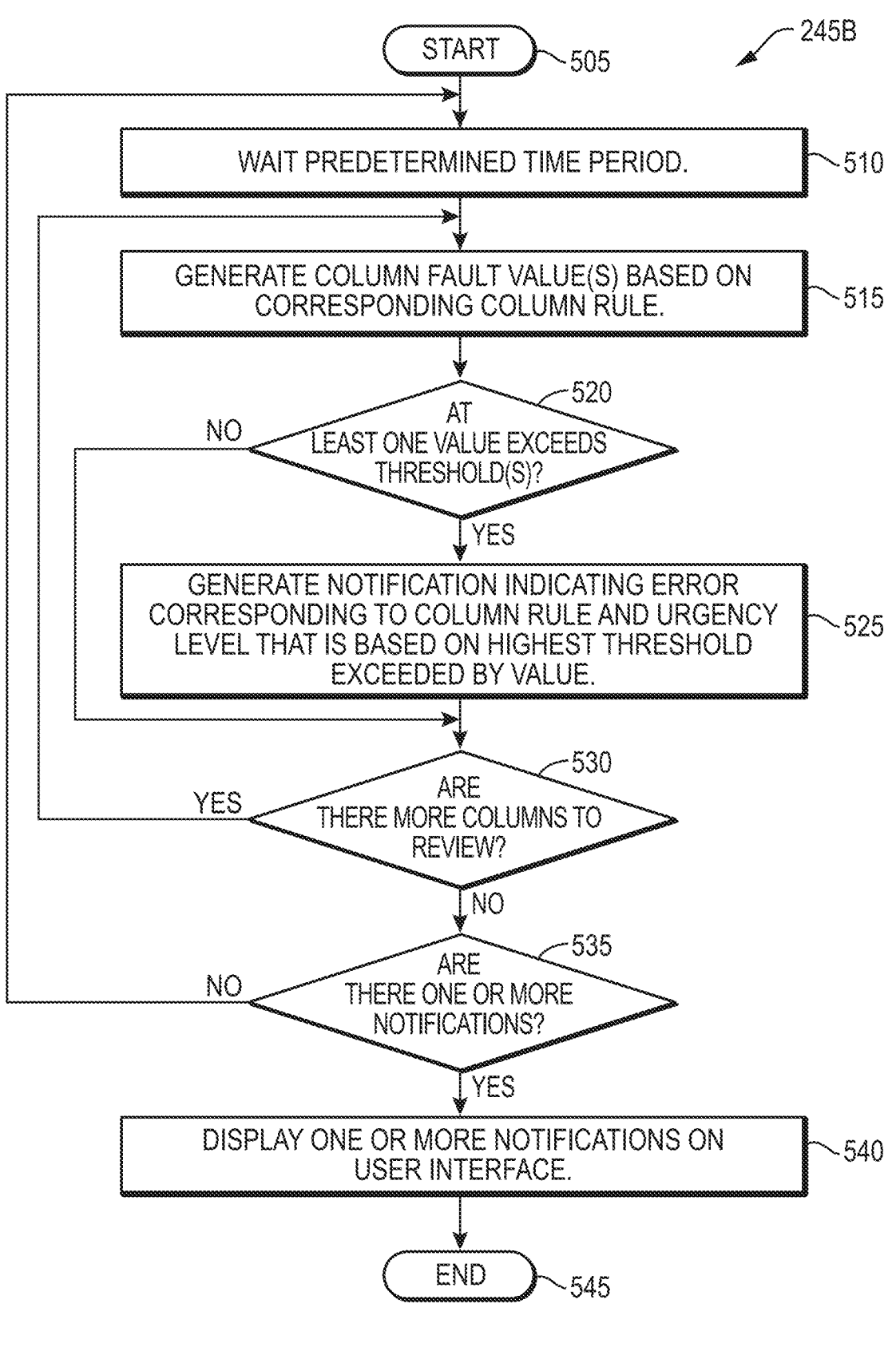
FIG. 5 is a flow diagram of a sequence of steps for automatically executing one or more column rules on a corresponding table of a dataset according to the one or more embodiments as described herein.

FIG. 5 is a flow diagram of a sequence of steps for automatically executing one or more column rules on a corresponding table of a dataset according to the one or more embodiments as described herein.

The procedure 245B may be a possible execution of step 245 of FIG. 2 according to some embodiments. Further, it should be noted that the procedure 245B may be performed in parallel, before, or after the procedure 245A. As such, the procedure 245B starts at step 505 and continues to step 510 where the error detecting module 118 waits a predetermined period of time (e.g., seconds, minutes, days, months, years, etc.). For example, the error detecting module 118 may execute the one or more column rules after waiting a predetermined time period after the completion of the coverage rule set (e.g., after all table rules and column rules have been determined). In another example, the error detecting module 118 may execute the one or more column rules after waiting a predetermined amount of time after a previous execution of the one or more table rules. In some embodiments, the error detection module 118 executes in time intervals, in which each time interval is equivalent to the predetermined period of time. In other embodiments, the dataset or the table may be updated in time intervals, in which each time interval is equivalent to the predetermined period of time. As such, the existence of a new version of the table may cause (or trigger) execution of each column rule in the coverage rule set.

The procedure continues to step 515, in which the error detecting module 118 generates one or more column fault values based on the corresponding column rule. More specifically, the error detecting module 118 may generate a column fault value for each column rule in the coverage rule set. Further, each column fault value may be generated using a specific process associated with each column rule. As such, the error detecting module 118 may generate a column fault value set that includes at column fault value for each column rule in the coverage rule set.

For example, each of the column fault value may be a number (e.g., integer, decimal, fraction, percentage, etc.) or binary value (e.g., one/zero, yes/no, true/false). In another example, each of the column fault values may be determined based on a data type or format that is specific to each column (e.g., time, date, numbers-only, no decimals or fractions, no special characters, cannot be blank, etc.). As such, it should be noted that the column fault value may be determined in a different manner for each column rule. Further, the type of column fault value (e.g., number, binary value, etc.) may also be different for each column rule as well.

At step 520, the error detecting module 118 determines whether at least one column fault value (of the column fault value set) exceeds a corresponding one or more predetermined thresholds. More specifically, each column rule is associated with (1) a specific process for generating the column fault value and (2) one or more predetermined thresholds. Each of the one or more predetermined thresholds associated with a specific column rule may indicate an error detected in the table, when the column fault value (generated using the specific column rule) exceeds at least one of the one or more predetermined thresholds associated with the specific column rule. For example, each of the predetermined thresholds may be a number (e.g., integer, decimal, fraction, percentage, etc.) or binary value (e.g., one/zero, yes/no, true/false).

In addition, each of the one or more predetermined thresholds (that are associated with a specific column rule) may be a predetermined value (e.g., urgency level) that is arranged in a predetermined order based on urgency or severity of the error(s). In other words, a higher urgency level (e.g., based on priority) indicates a more serious or a more pressing error has occurred in the column. Conversely, a lower urgency level (e.g., based on priority) indicates a less serious error has occurred in the column. In some embodiments, a larger valued urgency level (e.g., a larger number) signifies a more urgent error detected in the column, while a lower valued urgency level (e.g., a smaller number) signifies a more minor error detected in the column. In other embodiments, a column rule may include only a single urgency level (e.g., binary value indicating whether an error was detected).

If, at step 520, the error detecting module 118 determines that at least one column fault value exceeds at least one of the one or more predetermined thresholds, the process moves to step 525. As discussed previously, there may be more than one predetermined threshold, in which each predetermine threshold is arranged in order of urgency. Further, as also discussed previously, each of the one or more predetermined thresholds indicates an error detected in the table, when the column fault value exceeds at least one of the corresponding one or more predetermined thresholds. As such, it may be sufficient for the column fault value to exceed the lowest predetermined threshold for an error to be detected. Further, as discussed previously, the execution of the one or more column rules according to procedure 500 of FIG. 5 reduces the possibility of false positives.

At step 525, the error detecting module 118 generates (1) a notification indicating an error corresponding to the column rule and (2) an urgency level that is based on highest threshold exceeded by value. For example, the notification may be displayed on a user interface corresponding to the application 125 on a client computing device 110. In addition, the notification may, for example, provide a message indicating the error that was detected by a specific column rule.

In some embodiments, the notification may be a color-coded icon or indicator, in which the colors of the icon correspond to the highest predetermined threshold exceeded by the table fault value. For example, red may be associated with the highest predetermined threshold, orange may be associated with the next highest predetermined threshold, and yellow may be associated with the lowest predetermined threshold. Likewise, the color-coded icons may also be for the benefit of the user of the application 125, since the color red usually means a higher degree of severity and the color yellow usually means a lesser degree of severity (e.g., warning).

It should be noted that in some embodiments, an indicator may be presented to the user even in the case that no errors have been detected by a specific table rule (e.g., a table fault value of a table fault value set fails to exceed any corresponding predetermined thresholds). In such a case, the indicator may be color-coded (e.g., green) to indicate that the specific table rule has been successfully executed (but that no error was detected). In other embodiments, a color-coded indicator may be presented to the user regardless of whether an error was detected, in the case that the specific table rule was executed successfully.

If, at step 520, the error detecting module 118 determines that at least one column fault value (of the column fault value set) does not exceed at least one of the one or more predetermined thresholds (e.g., a single column fault value of the column fault value sets fails to exceed any of the one or more predetermined thresholds corresponding to the column fault value), the procedure moves to step 530.

At step 530, the error detecting module 118 determines whether there are more columns to review. As discussed previously, each column in the table may be associated with one or more column rules. In some embodiments, at least two of the columns may be associated with the same column rules. In other embodiments, none of the columns are associated with the same column rules as each other. As such, the error detecting module 118 may iterate through each of the columns (e.g., one by one) until there are no more columns in the table remaining to review. If, at step 530, the error detecting module 118 determines that there is at least one column remaining for review, the procedure moves back to step 515. If, at step 530, the error detecting module 118 determines that there are no more columns to review, the procedure moves to step 535.

At step 535, the error detecting module 118 determines whether it has generated one or more notifications (e.g., generated in step 535). If, at step 535, the error detecting module 118 determines that there are no notifications that have been generated (e.g., there are no errors detected in any of the columns in the table), the procedure moves back to step 510. If, at step 535, the error detecting module 118 determines that there are one or more notifications that have been generated, the procedure moves to step 540. At step 540, the error detecting module 118 displays one or more notifications on the user interface. For example, the notification may be displayed on a user interface corresponding to the application 125 on a client computing device 110.

In some embodiments, a column rule in the coverage rule set may include a validity rule, in which the validity rule determines whether an error has occurred due to one or more data elements having an incorrect data type (or format) or conditions in the corresponding column. For example, the error detecting module 118 (when executing the validity rule) may analyze the column in order to determine which data type is designated for each data element in the column as well as one or more conditions associated with the column (e.g., conditions that may limit the values that the data element may take). For example, a column indicating date of birth should include data elements having a date format (e.g., month-day-year) in which such date is the past. Any other formats, such as a single number or a word that is not month or day, may be considered erroneous by the validity rule.

As such, the column fault value associated with the validity rule may be a binary value, which indicates whether there are one or more data elements having an incorrect data type (or format) or violates one or more conditions associated with the column. Further, there may be a predetermined threshold (e.g., zero) associated with the validity rule, in which a binary value of zero (e.g., not exceeding the predetermined threshold) indicates that no error has been detected (e.g., each data element is in the proper data format and does not violate any conditions associated with the column) and a binary value of one (e.g., exceeding the predetermined threshold of zero) indicates that an error has been detected (e.g., one or more data elements in the column is in the incorrect data format or violates the one or more conditions).

In some embodiments, a column rule in the coverage rule set may include a completeness rule, in which the completeness rule determines whether an error has occurred due to one or more data elements being missing from the column (e.g., one or more rows corresponding to the column being empty). For example, the error detecting module 118 (when executing the completeness rule) may analyze the column in order to determine whether there is a row in the column that is empty (e.g., blank). For example, a column indicating a date of birth (or indicating a name) of an employee should not be associated with any blank rows.

As such, the column fault value associated with the completeness rule may be a binary value, which indicates whether there are one or more data elements that are missing from the column. Further, there may be a predetermined threshold (e.g., zero) associated with the completeness rule, in which a binary value of zero (e.g., not exceeding the predetermined threshold) indicates that no error has been detected (e.g., there are no missing data elements from the rows in the column) and a binary value of one (e.g., exceeding the predetermined threshold of zero) indicates that an error has been detected (e.g., there are missing data elements from rows in the column).

Figure 6:
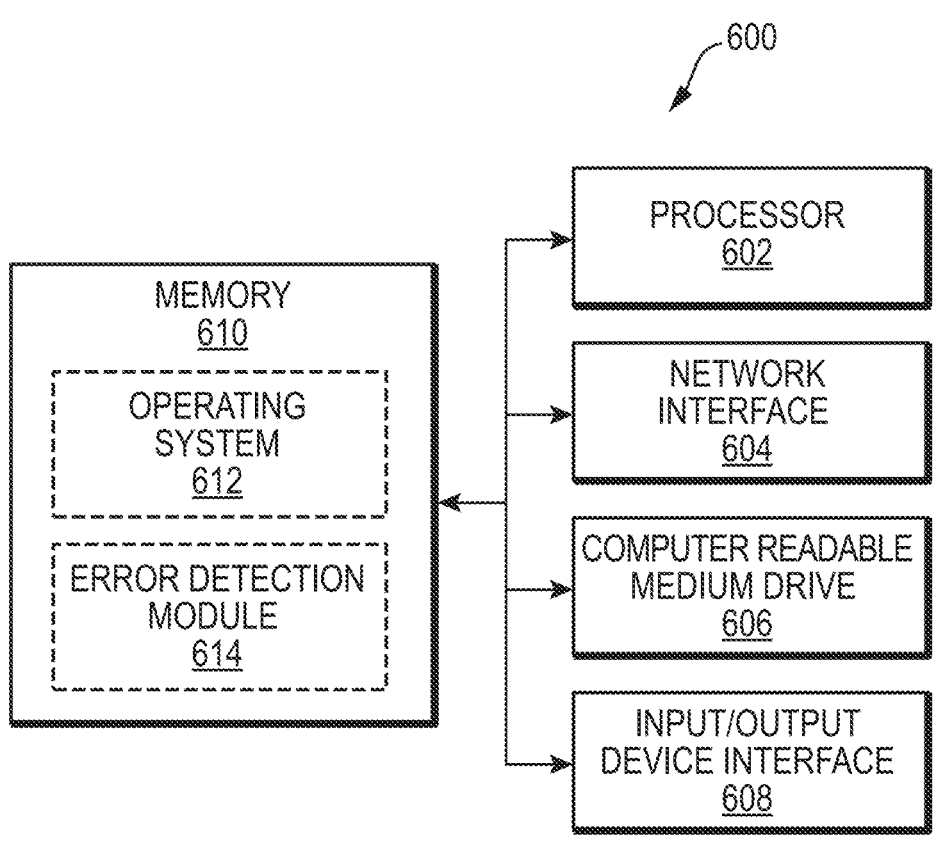
FIG. 6 is a diagram of an illustrative computing system that includes an error detection module according to the one or more embodiments as described herein.

FIG. 6 illustrates various components of an example computing device 600 configured to implement various functionality described herein.

In some embodiments, the computing device 600 may be implemented using any of a variety of computing devices, such as server computing devices, desktop computing devices, personal computing devices, mobile computing devices, mainframe computing devices, midrange computing devices, host computing devise, or some combination thereof. In some embodiments, the features and services provide by the computing device 600 may be implemented as webs services consumable via one or more communication networks. In further embodiments, the computing device 600 is provided by one or more virtual machines implemented in a hosted computing environment. The hosted computing environment may include one or more rapidly provisioned and released computing resources such as computing devices, networking devices, and/or storage devices. A hosted computing environment may also be referred to as a "cloud" computing environment.

In some embodiments, as shown, a computing device 600 may include one or more processors 602, such as physical central processing units ("CPUs"); one or more network interfaces 604, such as network interface cards ("NICs"); one or more computer readable medium drives 606, such as a high density disk ("HDDs"), solid state drives ("SSDs"), flash drives, and/or other persistent computer readable media; one or more input/output drive interfaces 608; and one or more computer-readable memories 610, such as random access memory ("RAM") and/or other volatile non-transitory readable media.

The one or more computer-readable memories 610 may include computer program instructions that one or more computer processors 602 execute and/or data that the one or more computer processors 602 use in order to implement one or more embodiment. For example, the one or more computer-readable memories 610 can store an operating system 612 to provide general administration of the computing device 600. As another example, the one or more computer-readable memories 610 can store error detection module 614 (e.g., error detection module 614) for generating one or more rules (table or column rules) for a table to detect errors in the table.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus (e.g., a programmable processor, a computer, and/or multiple computers). A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry (e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like). Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data (e.g., magnetic, magneto-optical disks, or optical disks). A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices (e.g., DRAM, SRAM, EPROM, EEPROM, and flash memory devices); magnetic disks (e.g., internal hard disks or removable disks); magneto-optical disks; and optical disks (e.g., CD, DVD, HD-DVD, and Blu-ray disks). The processor and the memory can be supplemented by and/or incorporated in special purpose logic circuitry.

To provide for interaction with a user, the above-described techniques can be implemented on a computing device in communication with a display device (e.g., a CRT (cathode ray tube), plasma, or LCD (liquid crystal display) monitor, a mobile device display or screen, a holographic device and/or projector, for displaying information to the user and a keyboard and a pointing device (e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, and/or tactile input).

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for monitoring the integrity of a table in a dataset, the method comprising:

identifying a table criticality level corresponding to the table and a column criticality level corresponding to each column in the table;

adding one or more table rules to a coverage rule set when the table criticality level is at a first table tier, wherein the one or more table rules are configured to detect errors in a current version of the table based on one or more previous versions of the table, and wherein the one or more table rules are each associated with one or more table rule thresholds that are ordered by degrees of urgency;

adding one or more column rules for each column to the coverage rule set when the column criticality level of a respective column is at a first column tier, wherein the one or more column rules associated with each column are configured to detect errors in data elements that are associated with the respective column, and wherein the one or more column rules are each associated with one or more column rule thresholds that are ordered by degrees of urgency;

generating a table fault value for each table rule in the coverage rule set and a column fault value for each column rule in the coverage rule set;

detecting an error when a table fault value or column fault value exceeds at least one of a corresponding table rule threshold or a corresponding column rule threshold, wherein a degree of urgency associated with the error corresponds to a maximum rule threshold exceeded by the table fault value or column fault value; and transmitting a notification for each table rule or column rule that has detected an error in the table, the notification including a result status that indicates a degree of urgency corresponding to a respective table rule or column rule.

2. The computer-implemented method of claim 1, wherein the one or more table rules or the one or more column rules are added to the coverage rule set based on one or more attributes of the table including at least one of a table type, one or more data elements included in the table, one or more column types corresponding to respective columns in the table, business terms, and data profiles.

3. The computer-implemented method of claim 1, further comprising:

identifying a plurality of tables that each include one or more attributes, wherein each of the plurality of tables is associate with a coverage rule set;

determining one or more similar tables of the plurality of tables that include each attributes that are similar to attributes of the table; and adding one or more column rules and one or more table rules to the coverage rule set based on the coverage rule set corresponding to each of the one or more similar tables.

4. The computer-implemented method of claim 1, wherein the one or more table rules includes a timeliness rule, the execution of the timeliness rule on the table comprising:

determining whether an updated version of the table has been generated for a most recent time interval, wherein the table is continuously updated at a predetermined time interval;

generating a timeliness fault value, which is a binary value that indicates whether the updated version of the table exists;

detecting a timeliness error when the timeliness fault value exceeds one or more timeliness rule thresholds, in which the timeliness error indicates that the updated version of the table has not been generated for the most recent time interval; and transmitting a notification indicating the detection of the timeliness error.

5. The computer-implemented method of claim 1, wherein the one or more table rules includes a variance rule, the execution of the variance rule on the table comprising:

retrieving the one or more previous versions of the table;

determining a first average variability which indicates the average differences among a number of rows in the one or more previous versions of the table and a second average variability which indicates the average differences among a number of rows in the current version of the table and the one or more previous versions of the table;

generating a variance fault value that indicates a difference between the first average variability and the second average variability;

detecting a variance error when the variance fault value exceeds one or more variance rule thresholds, in which the variance error indicates a degree of urgency corresponding to the amount of variation among the current version of the table and the one or more previous versions of the table, wherein the degree of urgency is determined by a maximum variance rule threshold exceeded by the variance fault value; and transmitting a notification indicating the detection of the variance error, the notification including a result status that indicates the degree of urgency corresponding to the variance rule.

6. The computer-implemented method of claim 1, wherein the one or more table rules includes a consistency rule, the execution of the consistency rule on the table comprising:

retrieving a copy of the table from a trustworthy source;

generating a consistency fault value that indicates the amount of variability between the table and the copy of the table;

detecting a consistency error when the consistency fault value exceeds one or more consistency rule thresholds, in which the consistency error indicates a degree of urgency corresponding to the amount of variation between the table and the copy of the table, wherein the degree of urgency is determined by a maximum consistency rule threshold exceeded by the consistency fault value; and transmitting a notification indicating the detection of the consistency error, the notification including a result status that indicates the degree of urgency corresponding to the consistency rule.

7. The computer-implemented method of claim 1, wherein the one or more column rules includes a validity rule, the execution of the validity rule comprising:

identifying a data type requirement for a column associated with the validity rule, wherein the data type requirement indicates a data type that is expected for each data element in the column associated with the validity rule;

generating a validity fault value, which includes a binary value that indicates whether at least one data element in the column associated with the validity rule includes a data type that is different from the data type indicated in the data type requirement;

detecting a validity error when the validity fault value exceeds one or more validity rule thresholds, in which the validity error indicates the existence of one or more data elements in the column associated with the validity rule that includes a data type that is different from the data type indicated in the data type requirement; and transmitting a notification indicating the detection of the validity error.

8. The computer-implemented method of claim 1, wherein the one or more coverage rules includes a completeness rule, the execution of the completeness rule comprising:

identifying data elements that are missing from a column associated with the completeness rule;

generating a completeness rule result, which includes a binary value that indicates whether at least one of the missing data elements is expected to be present in the column associated with the completeness rule;

detecting a completeness error when the completeness fault value exceeds one or more completeness rule thresholds, in which the completeness error indicates the existence of missing data elements that are expected to be present in the column associated with the completeness rule; and transmitting a notification indicating the detection of the completeness error.

9. The computer-implemented method of claim 1, further comprising:

receiving instructions to generate a view based one or more tables in the dataset, wherein table rules or column rules in the coverage rule set, associated with each of the one or more tables used to generate the view, have been previously executed;

generating the view according to the instructions;

identifying one or more modified columns in the view that include one or more data elements that are modified from the one or more tables used to generate the view and one or more new columns that have been generated based on the instructions;

adding one or more column rules to a view coverage rule set for each modified column in the view and for each of the one or more new columns in the view; and executing the column rules in the view coverage rule set.

10. The computer-implemented method of claim 1, wherein the notification is in the form of a user interface icon, in which the degree of urgency is represented by different states of the user interface icon.

11. A system for monitoring the integrity of a table in a dataset, the system comprising:

a memory; and a processor coupled to the memory, the processor executing a software module configured to:

identify a table criticality level corresponding to the table and a column criticality level corresponding to each column in the table;

add one or more table rules to a coverage rule set when the table criticality level is at a first table tier, wherein the one or more table rules are configured to detect errors in a current version of the table based on one or more previous versions of the table, and wherein the one or more table rules are each associated with one or more table rule thresholds that are ordered by degrees of urgency;

add one or more column rules for each column to the coverage rule set when the column criticality level of a respective column is at a first column tier, wherein the one or more column rules associated with each column are configured to detect errors in data elements that are associated with the respective column, and wherein the one or more column rules are each associated with one or more column rule thresholds that are ordered by degrees of urgency;

generate a table fault value for each table rule in the coverage rule set and a column fault value for each column rule in the coverage rule set;

detect an error when a table fault value or column fault value exceeds at least one of a corresponding table rule threshold or a corresponding column rule threshold, wherein a degree of urgency associated with the error corresponds to a maximum rule threshold exceeded by the table fault value or column fault value; and transmit a notification for each table rule or column rule that has detected an error in the table, the notification including a result status that indicates a degree of urgency corresponding to a respective table rule or column rule.

12. The system of claim 11, wherein the one or more table rules or the one or more column rules are added to the coverage rule set based on one or more attributes of the table including at least one of a table type, one or more data elements included in the table, one or more column types corresponding to respective columns in the table, business terms, and data profiles.

13. The system of claim 11, wherein the software module is further configured to:

identify a plurality of tables that each include one or more attributes, wherein each of the plurality of tables is associate with a coverage rule set;

determine one or more similar tables of the plurality of tables that include each attributes that are similar to attributes of the table; and add one or more column rules and one or more table rules to the coverage rule set based on the coverage rule set corresponding to each of the one or more similar tables.

14. The system of claim 11, wherein the one or more table rules includes a timeliness rule, the execution of the timeliness rule on the table comprising:

determining whether an updated version of the table has been generated for a most recent time interval, wherein the table is continuously updated at a predetermined time interval;

generating a timeliness fault value, which is a binary value that indicates whether the updated version of the table exists;

detecting a timeliness error when the timeliness fault value exceeds one or more timeliness rule thresholds, in which the timeliness error indicates that the updated version of the table has not been generated for the most recent time interval; and transmitting a notification indicating the detection of the timeliness error.

15. The system of claim 11, wherein the one or more table rules includes a variance rule, the execution of the variance rule on the table comprising:

retrieving the one or more previous versions of the table;

determining a first average variability which indicates the average differences among a number of rows in the one or more previous versions of the table and a second average variability which indicates the average differences among a number of rows in the current version of the table and the one or more previous versions of the table;

generating a variance fault value that indicates a difference between the first average variability and the second average variability;

detecting a variance error when the variance fault value exceeds one or more variance rule thresholds, in which the variance error indicates a degree of urgency corresponding to the amount of variation among the current version of the table and the one or more previous versions of the table, wherein the degree of urgency is determined by a maximum variance rule threshold exceeded by the variance fault value; and transmitting a notification indicating the detection of the variance error, the notification including a result status that indicates the degree of urgency corresponding to the variance rule.

16. The system of claim 11, wherein the one or more table rules includes a consistency rule, the execution of the consistency rule on the table comprising:

retrieving a copy of the table from a trustworthy source;

generating a consistency fault value that indicates the amount of variability between the table and the copy of the table;

detecting a consistency error when the consistency fault value exceeds one or more consistency rule thresholds, in which the consistency error indicates a degree of urgency corresponding to the amount of variation between the table and the copy of the table, wherein the degree of urgency is determined by a maximum consistency rule threshold exceeded by the consistency fault value; and transmitting a notification indicating the detection of the consistency error, the notification including a result status that indicates the degree of urgency corresponding to the consistency rule.

17. The system of claim 11, wherein the one or more column rules includes a validity rule, the execution of the validity rule comprising:

identifying a data type requirement for a column associated with the validity rule, wherein the data type requirement indicates a data type that is expected for each data element in the column associated with the validity rule;

generating a validity fault value, which includes a binary value that indicates whether at least one data element in the column associated with the validity rule includes a data type that is different from the data type indicated in the data type requirement;

detecting a validity error when the validity fault value exceeds one or more validity rule thresholds, in which the validity error indicates the existence of one or more data elements in the column associated with the validity rule that includes a data type that is different from the data type indicated in the data type requirement; and transmitting a notification indicating the detection of the validity error.

18. The system of claim 11, wherein the one or more coverage rules includes a completeness rule, the execution of the completeness rule comprising:

identifying data elements that are missing from a column associated with the completeness rule;

generating a completeness rule result, which includes a binary value that indicates whether at least one of the missing data elements is expected to be present in the column associated with the completeness rule;

detecting a completeness error when the completeness fault value exceeds one or more completeness rule thresholds, in which the completeness error indicates the existence of missing data elements that are expected to be present in the column associated with the completeness rule; and transmitting a notification indicating the detection of the completeness error.

19. The system of claim 11, wherein the software module is further configured to:

receive instructions to generate a view based one or more tables in the dataset, wherein table rules or column rules in the coverage rule set, associated with each of the one or more tables used to generate the view, have been previously executed;

generate the view according to the instructions;

identify one or more modified columns in the view that include one or more data elements that are modified from the one or more tables used to generate the view and one or more new columns that have been generated based on the instructions;

add one or more column rules to a view coverage rule set for each modified column in the view and for each of the one or more new columns in the view; and execute the column rules in the view coverage rule set.

20. The system of claim 11, wherein the notification is in the form of a user interface icon, in which the degree of urgency is represented by different states of the user interface icon.

*    *    *    *    *